United States Patent
Geisner et al.

(10) Patent No.: US 8,343,246 B2
(45) Date of Patent: Jan. 1, 2013

(54) SEPARATOR

(75) Inventors: Jürgen Geisner, Duisburg (DE); Lutz Pinkepank, Plettenberg Bay (ZA)

(73) Assignee: Siemens Aktiengesellschaft, München (DE)

( * ) Notice: Subject to any disclaimer, the term of this patent is extended or adjusted under 35 U.S.C. 154(b) by 432 days.

(21) Appl. No.: 12/670,456

(22) PCT Filed: Jun. 25, 2008

(86) PCT No.: PCT/EP2008/058055
§ 371 (c)(1),
(2), (4) Date: Jan. 25, 2010

(87) PCT Pub. No.: WO2009/015949
PCT Pub. Date: Feb. 5, 2009

(65) Prior Publication Data
US 2010/0206170 A1    Aug. 19, 2010

(30) Foreign Application Priority Data
Jul. 27, 2007 (EP) ..................... 07014818

(51) Int. Cl.
*B01D 45/00*    (2006.01)
(52) U.S. Cl. .............. 55/440; 55/441; 55/442; 55/443; 55/444; 55/445; 55/464; 55/465; 55/DIG. 17; 55/DIG. 37; 96/355; 96/365

(58) Field of Classification Search ............ 55/440–445, 55/464–465, DIG. 17, DIG. 37; 96/355–365
See application file for complete search history.

(56) References Cited

U.S. PATENT DOCUMENTS

| 4,264,411 | A | * | 4/1981 | Almond, Jr. ................... 159/1.1 |
| 4,877,431 | A | | 10/1989 | Avondoglio |
| 4,902,317 | A | * | 2/1990 | Gutermuth ..................... 55/326 |
| 5,112,375 | A | | 5/1992 | Brown |

FOREIGN PATENT DOCUMENTS

| CH | 561076 A5 | 4/1975 |
| EP | 0043760 A1 | 1/1982 |
| EP | 0306807 A1 | 3/1989 |
| EP | 0462687 A1 | 12/1991 |
| GB | 2199260 A | 7/1988 |
| JP | 56053716 A | 5/1981 |
| JP | 5060093 A | 3/1993 |
| SU | 578985 A1 | 11/1977 |

* cited by examiner

*Primary Examiner* — Jason M Greene
*Assistant Examiner* — Dung H Bui

(57) ABSTRACT

A separator is provided. The separator in which the flow is conducted using separation elements from an inflow to an outflow in such a manner that at reversal points media separators deposit a separation medium. Depending on the flow through them and the orientation with respect to the acceleration due to gravity, individually shaped separating elements are arranged in such a manner that at least two different paths of the flow along the separating elements in the separator form.

13 Claims, 2 Drawing Sheets

SEPARATOR

CROSS REFERENCE TO RELATED APPLICATIONS

This application is the US National Stage of International Application No. PCT/EP2008/058055, filed Jun. 25, 2008 and claims the benefit thereof. The International Application claims the benefits of European Patent Office application No. 07014818.4 EP filed Jul. 27, 2007. All of the applications are incorporated by reference herein in their entirety.

FIELD OF INVENTION

The invention relates to a separator, particularly a demister, for separating a separating medium, particularly a liquid, from a flowing fluid, having at least one inflow and at least one outflow, the flow through the separator being conducted by means of separating elements which deflect the flow at deflecting points and have media separators in the region of the deflecting points, the flowing fluid flowing through the separator along at least two paths, a first path and a second path, which differ with respect to their orientation with respect to the acceleration due to gravity.

BACKGROUND OF INVENTION

In various processes, the separation of liquids, particularly condensates, that form drops in a flowing fluid is of decisive importance. Sometimes, the condensate is of particular interest for further processing treatment, but usually the aim of separation is to free the flowing fluid of liquid constituents that could adversely affect the subsequent process steps. For example, compression of a fluid laden with condensate in the form of liquid drops often entails unacceptably great wear or even unavoidable damage to the compressor. A frequent application for liquid separators is that of following cooling of a flowing fluid, for example in the case of intermediate cooling between two compression stages of a compression process. For separating condensate, drop separators of the vane type, the functioning direction of which is vertical to the direction of flow, are often used in the prior art. The most frequent form of application here is that of a flow through these separators perpendicular to the acceleration due to gravity and an outflow of the separating medium or the liquid through separating elements driven by the acceleration due to gravity.

Such arrangements take up considerable space and, in particular, prevent a compact integral type of construction, for example with a compressor or other processing devices with which the separators are in connection. The separate installation of the separators additionally has the consequence that the topology of the installation is adapted to the local conditions and the individual processing devices, in particular the separator, are connected to the following processing devices by means of simple pipework that has not been optimized in terms of flow, since this would be too complex for the respective individual case. A combined configuration of a separator with the adjacent processing devices would be very conducive to modularity. However, the previously inflexible use of separators as a result of the often box-shaped formation of these units prevents an integrated form of construction. The lack of flexibility is attributable in particular to the type of installation of conventional separators that is described above.

SUMMARY OF INVENTION

On the basis of the problems described above, the invention therefore addresses the object of providing a separator that makes a greater degree of flexibility possible with respect to installation, and consequently particularly makes an integrated form of construction with other processing devices possible.

To achieve the object according to the invention, it is proposed to develop a separator of the type mentioned at the beginning in such a way that at least one separating element which conducts the flow along the first path is formed differently than another separating element which conducts the flow along the second path.

The invention involves the recognition that the lack of flexibility of separators is caused particularly by the way in which the internal separating elements function. As a result of their identical forms, all the separating elements of a conventional separator must be installed in a specific orientation with respect to the fluid flow and with respect to the acceleration due to gravity in order to ensure correct functioning. In addition, all the separating elements of conventional separators are oriented virtually identically or do not operate with their full effect. The invention takes a new approach here, in that on the one hand the separating elements are no longer oriented identically to the acceleration due to gravity and on the other hand the separating elements themselves are individually adapted to a certain degree to their orientation. On the one hand, this type of construction has the advantage that, as a departure from the previous box shape of often rectangular cross section, other forms become technically possible and, on the other hand, not only are the new forms of construction no less efficient but also the existing separating elements are used more efficiently as a result of their individual adaptation to the respective installed position. The possibilities of more flexible shaping of the separator at the same time open up the way to integration of the separator in or on adjacent processing devices, so, for example, a separator may be an integrated modular component of an intermediately cooled compressor, with the result that a liquid separation by means of a demister takes place after every intermediate cooling. Such a demister or separator may expediently extend annularly around the inlet into a radial compression stage and, for example, be flowed through from the outside to the inside.

The separating elements are expediently formed in a wavy or serrated manner transversely with respect to the direction of flow on at least one flowed-over surface, with the result that the flow is deflected at the wave or serration profile. To ensure a flow with as little loss as possible through the separator along these deflecting profiles, flow guides which prevent a flow in the longitudinal direction of the wave or serration form may be provided at optimized intervals. An advantageous development provides that the media separators are formed as clearances in the region of the deflecting points on the separating elements, with the result that fractions of the fluid that do not fully follow the deflection enter the clearances as separating medium and are separated to a separating side of the separating element. The fractions of the fluid that finally form the separating medium are often those of higher density, particularly condensates. A particular challenge for the invention is the avoidance of a return flow of the separating medium from the separating elements to the side of the cleaned fluid. For this purpose, the invention preferably provides flow conducting elements on the separating side of the separating element for conducting the separating medium, which are attached in the region of the clearance and prevent a return flow of the separating medium through the clearance. Precisely these flow conducting elements are individually adapted with regard to their form and/or their position and/or the orientation of their attachment on the separating side in the region of the clearance to the orientation of the separating element with respect to the fluid flow and in particular with respect to the acceleration due to gravity.

The separating elements are advantageously formed as wavy or serrated hollow chambers, the separating side being located in the interior of the cooling chamber. In particular, this hollow chamber form makes it possible for a flow to pass on both sides around the separating elements if the hollow chamber is not only formed in a serrated or wavy manner on one side, but at least two surfaces of the hollow chamber follow a wave form or serration form. Those surfaces that divert the flow by means of an impingement or buildup as a result of their intervention in the flow are defined as pressure sides of the separating element and the other surfaces are defined as suction sides, so the media separators or clearances are provided on the pressure sides of the separating elements. If such a separating element is formed as a hollow chamber with two mutually opposite wavy or serrated surfaces that are flowed around by the fluid, on the respective pressure sides at least one media separator is respectively located on both sides, with the result that separating medium preferably flows on alternate sides in the direction of flow to the separating side of the hollow chamber.

The separating side is advantageously in flow-conducting connection with a collector, with the result that the separating medium collects in the collector, preferably driven by the gravitational force. The separating element is expediently oriented in the separator and with respect to the collector in such a way that the separating medium collects in the collector, only driven by the acceleration due to gravity.

A preferred embodiment provides that the flow conducting elements cover the clearances on the separating side in the manner of roofing tiles, with the result that separating fluid driven by the acceleration due to gravity does not return through the clearances of the media separators.

When the separator is foamed as a ring separator or ring segment separator, which extends at least over part of a circumferential direction and is flowed through radially, it is advisable if, depending on their circumferential position, the separating elements are divided into groups of different forms, with the result in particular that the separating medium does not return from the separating side to the side of the fluid flow. The division into groups may take place for example in regions of circumferential angles, so segment regions of 45° or 30° have proven to be expedient. It may be advantageously taken into account here that, with regard to their orientation with respect to the acceleration due to gravity, part of a ring separator that is on the left for example is symmetrical with respect to the part on the right and also the separating elements in corresponding circumferential positions can therefore be formed identically.

The invention is explained more clearly below on the basis of a specific exemplary embodiment. The reference to this known embodiment, the best possible at this time, is not to be understood as a restriction of the invention to this embodiment. Rather, numerous other embodiments that are likewise attributable to the invention are evident to a person skilled in the art from this description of the invention.

DETAILED DESCRIPTION OF INVENTION

Figure 1:
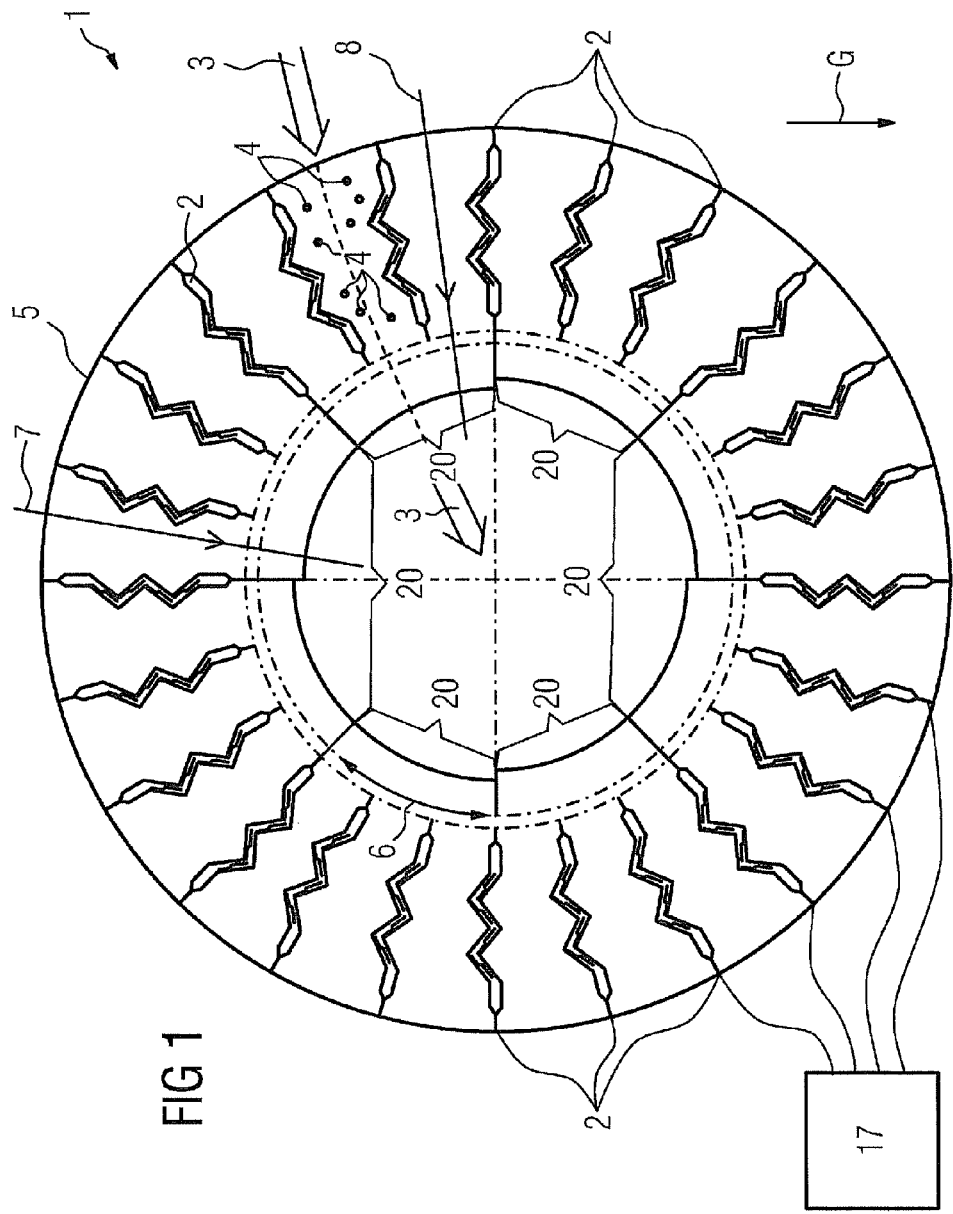
FIG. 1 shows a schematic representation of a ring separator according to the invention or of separating elements in various circumferential positional groups.

FIG. 1 shows an annular separator 1 in a schematic representation, for the sake of simplification only some separating elements 2 being shown as representative of separating elements 2 in various circumferential positions. The separator 1 is flowed through radially from the outside to the inside by a fluid 3, which transports condensate or a separating medium 4. The outer circumference of the separator forms an inflow 5, and the surface extending into the plane of the drawing on the inner diameter forms an outflow 6. Between the various separating elements 2 there are different paths of through-flow by the fluid 3, with the result that, if the annular separator 1 is divided up in the manner of a dial of an analog clock, a first path 7 at 12:00 hours has a different orientation than a second path 8, for example at 03:00 hours, with respect to the acceleration due to gravity G. With respect to the acceleration due to gravity G, all the paths 7, 8 between the individual separating elements 2 of a half-ring between 06:00 and 12:00 hours and between 12:00 and 06:00 hours differ with regard to their orientation with respect to the acceleration due to gravity G.

Figure 2:
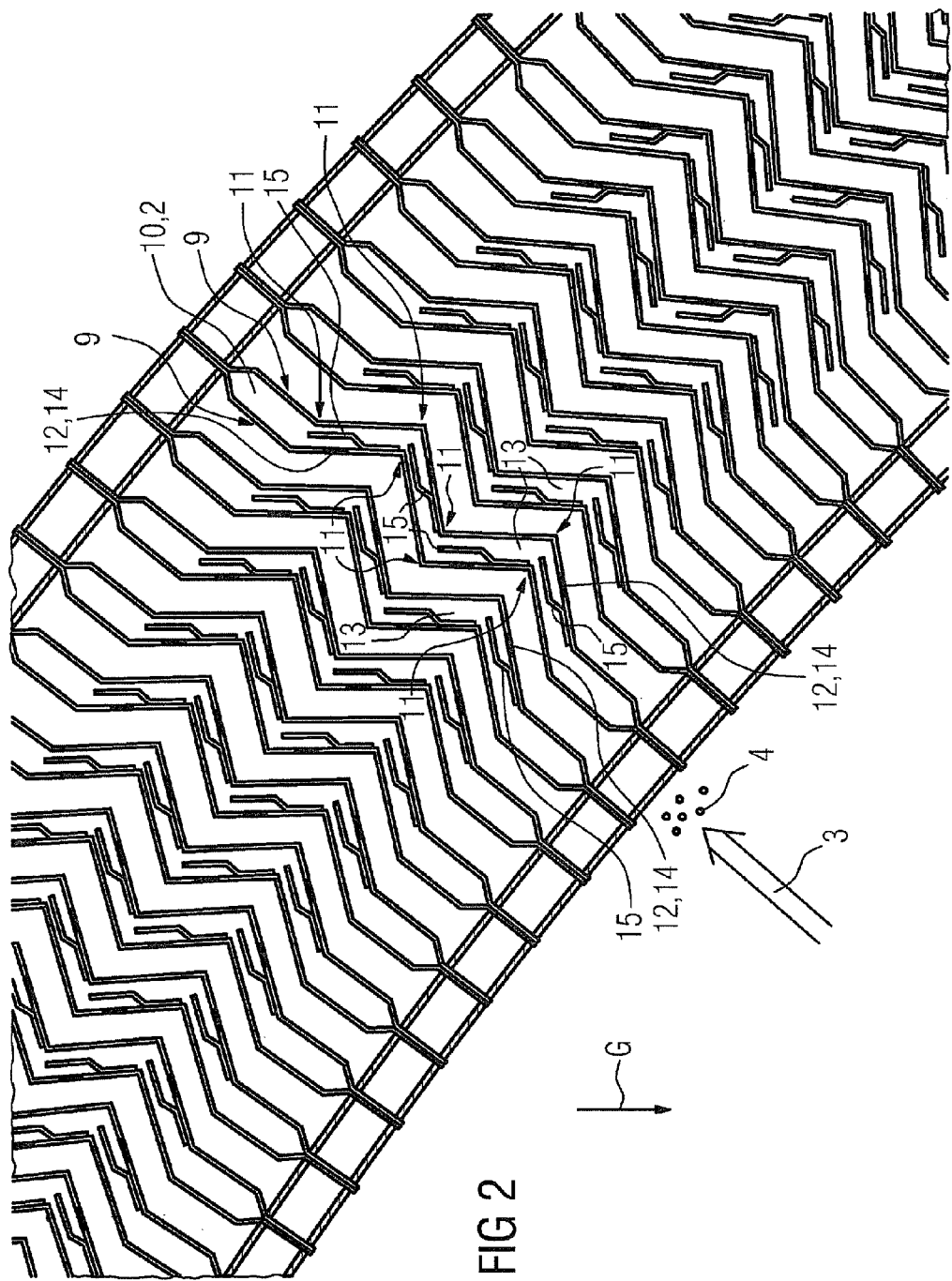
FIG. 2 shows a detailed representation of a circumferential positional region of a ring separator according to the invention.

The separator of FIG. 2 is flowed through from the inside to the outside. As shown in detail in FIG. 2, the separating elements are formed as hollow chambers 10, each hollow chamber 10 having two opposing flowed-over surfaces 9, which are formed in a zigzag-shaped manner, the channels formed by the zigzag form extending transversely with respect to the direction of flow of the fluid 3. In this way, the fluid 3 is alternately deflected at deflecting points 11 from the path of a straight radial into the circumferential direction of the ring form of the separator 1. There where the fluid leaves its radial path to impinge as it were on the flowed-over surface 9 at a deflecting point 11 there is a media separator 12 in the form of a clearance 14, which is entered by fractions of the fluid 3 that cannot completely follow the deflection as separating medium 4, passing to a separating side 13 of the separating element 2. These fractions 4 of the fluid 3 often have a higher density, with the result that they are carried into the media separator 12 by the centrifugal force at the deflecting point 11. The hollow chamber 10 of the separating element 2 forms the separating side 13, the separated separating medium 4 collecting initially at specific points of the cross-sectional form in the hollow chamber 10, driven by the acceleration due to gravity G.

In order that none of the separating medium 4 returns to the side of the flowing fluid 3, provided in the interior of the hollow chamber 10 are flow conducting elements 15, which cover the media separators 12 or clearances 14 in the manner of roofing tiles in such a way that, as it flows in the region of the clearance 14, the separating medium 4 can pass the latter without escaping.

The hollow chambers 10 or the separating side 13 are/is in connection with a collector 17, into which the separated separating medium 14 flows, driven by the acceleration due to gravity G.

The separating elements 2 are all in different orientations in relation to the acceleration due to gravity G and are on the one hand formed differently in respect of their outer contour, or at least arranged differently, and on the other hand have a different attachment of the flow conducting elements 15 in the interior of the hollow chamber 10 or on the separating side 13. Depending on their circumferential position or orientation with respect to the acceleration due to gravity G, the separating elements 2 are divided into groups 20 of different forms, association with a group respectively extending over approximately 45° of a circumferential angle, in the present example from 06:00 hours to 07:30 hours, from 07:00 to 09:00 hours, from 09:00 to 10:30 hours and from 10:30 hours to 12:00 hours and correspondingly mirror-symmetrically on the other side of the vertical axis of symmetry. Therefore, in the 10:30-13:30 hours and 4:30-19:30 hours positions, a group 20 extending over 90° is respectively obtained.

The invention claimed is:

1. A separator for separating a separating medium from a flowing fluid, comprising:
an inflow;
an outflow; and
a plurality of separating elements,
wherein a flow through the separator is conducted using the plurality of separating elements which deflect the flow at a plurality of deflecting points and include a plurality of media separators in a first region of the deflecting points,
wherein the plurality of media separators are formed as a plurality of clearances in the first region on the plurality of separating elements, with the result that fractions of the fluid that do not fully follow the deflection enter the plurality of clearances as the separating medium and are separated to a separating side of the separating element,
wherein the flowing fluid flows through the separator along at least two different paths, a first path and a second path,
wherein the first path and the second path differ with respect to an orientation with respect to an acceleration due to gravity, and
wherein a first separating element which conducts the flow along the first path is formed differently than a second separating element which conducts the flow along a second path.

2. The separator as claimed in claim 1, wherein the separator is a demister.

3. The separator as claimed in claim 2, wherein the separator is formed as a ring and is flowed through radially.

4. The separator as claimed in claim 2, wherein the separator is formed as a ring segment and is flowed through radially.

5. The separator as claimed in claim 2,
wherein the plurality of separating elements are formed in a wavy manner transversely with respect to a direction of flow on a flowed-over surface, and
wherein the flow is deflected at a wave profile.

6. The separator as claimed in claim 2,
wherein the plurality of separating elements are formed in a serrated manner transversely with respect to the direction of flow on a flowed-over surface, and
wherein the flow is deflected at a serration profile.

7. The separator as claimed in claim 2,
wherein each separating element includes a plurality of flow conducting elements on the separating side for conducting the separating medium, and
wherein the plurality of flow conducting elements are attached in a second region of the clearance and prevent a return flow of the separating medium through a clearance.

8. The separator as claimed in claim 2,
wherein the plurality of separating elements are formed as a plurality of serrated hollow chambers, and
wherein the separating side is located in an interior of the hollow chamber.

9. The separator as claimed in claim 2,
wherein the plurality of separating elements are formed as a plurality of wavy hollow chambers, and
wherein the separating side is located in an interior of the hollow chamber.

10. The separator as claimed in claim 2,
wherein the separating side is in a flow-conducting connection with a collector, and
wherein the separating medium collects in the collector.

11. The separator as claimed in claim 10, wherein the plurality of separating elements are oriented in the separator and with respect to the collector in such a way that the separating medium collects in the collector driven by the acceleration due to gravity.

12. The separator as claimed in claim 2,
wherein each separating element includes a plurality of flow conducting elements,
wherein the plurality of flow conducting elements cover the plurality of clearances in a manner of roofing tiles, and
wherein the separating medium, driven by the acceleration due to gravity, does not return through the plurality of clearances.

13. The separator as claimed in claim 2,
wherein the separator is formed as a ring separator with radial through-flow,
wherein depending on a circumferential position of the plurality of separating elements, the plurality of separating elements are divided into a plurality of groups each group including a different form, and
wherein the separating medium cannot return from the separating side.

\* \* \* \* \*